United States Patent [19]

Fish

[11] Patent Number: 5,638,734

[45] Date of Patent: Jun. 17, 1997

[54] BAGEL AND BUN SLICER APPARATUS AND METHOD OF USE

[76] Inventor: Richard I. Fish, 6744 Robert St., West Palm Beach, Fla. 33413

[21] Appl. No.: 615,680

[22] Filed: Mar. 13, 1996

[51] Int. Cl.⁶ .................................................. B26D 7/02
[52] U.S. Cl. ................. 83/762; 83/932; 83/454; 83/870
[58] Field of Search ................ 83/762, 870, 932, 83/454, 466.1, 467.1, 468.5, 468.6, 468.7; 269/87.2, 295

[56] References Cited

U.S. PATENT DOCUMENTS

| | | | |
|---|---|---|---|
| 280,796 | 7/1883 | Chapman | 83/454 X |
| 1,703,154 | 2/1929 | Lanzkron | 269/87.2 X |
| 2,290,169 | 7/1942 | Debus | 83/454 X |
| 3,018,806 | 1/1962 | Moore | 83/762 X |
| 4,085,642 | 4/1978 | Birmingham | 83/764 X |
| 4,125,046 | 11/1978 | Kroh et al. | 83/762 X |
| 4,249,445 | 2/1981 | Browning | 83/762 X |
| 4,399,989 | 8/1983 | Baillie | 83/762 X |
| 4,546,686 | 10/1985 | Leslowski et al. | |
| 4,550,636 | 11/1985 | Josselson et al. | 83/762 X |
| 4,599,928 | 7/1986 | Oker | 83/932 X |
| 4,747,331 | 5/1988 | Policella | |
| 4,807,505 | 2/1989 | Campbell | |
| 4,807,862 | 2/1989 | Popeil et al. | 83/762 X |
| 5,361,666 | 11/1994 | Kensrue | |
| 5,431,078 | 7/1995 | Ricard et al. | |
| 5,481,953 | 1/1996 | McLeod | 83/932 X |

Primary Examiner—Rinaldi I. Rada
Assistant Examiner—Boyer Ashley
Attorney, Agent, or Firm—McHale & Slavin, P.A.

[57] ABSTRACT

A device for slicing a bagel equally in half, or in thirds, or in quarters without having to make any adjustments for such desired variations. The device is simple in construction and serves to operably guide a knife through a bagel. Other foodstuffs such as buns, rolls and muffins including soft textured foodstuffs can be accommodated without deforming or destroying the foodstuff. The device is comprised of a rectangular base having four side guide rods at right angles to the base and placed so as to hold a foodstuff central to the width of the base. Additionally, a set of paired end cradling rods at each end of the base taper outwardly as they extend upwardly. The end cradle rods accommodate bagels of various diameters thereby preventing end to end movement of a bagel while it is being sliced. The end cradle rods serve to guide a knife blade between the slots formed by the adjoining, paired cradle rods. A pair of reversible winged side guards fit over the side guide rods keeping the user's hand outside the bagel slicing area plus allowing for the slicing of narrower than bagel foodstuffs, such as donuts, etc.

14 Claims, 3 Drawing Sheets

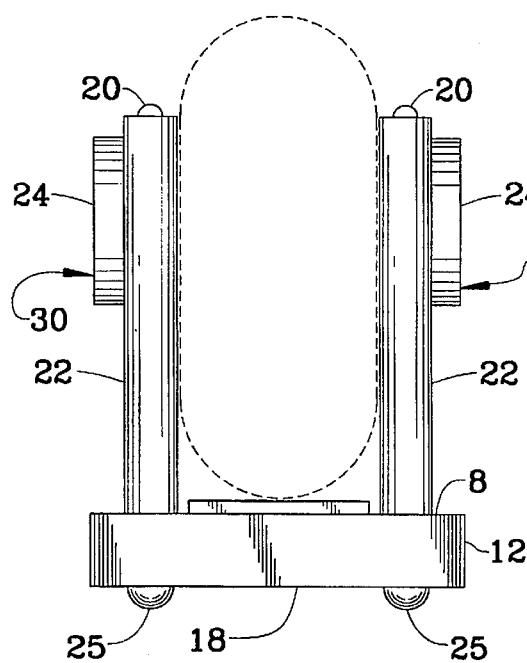
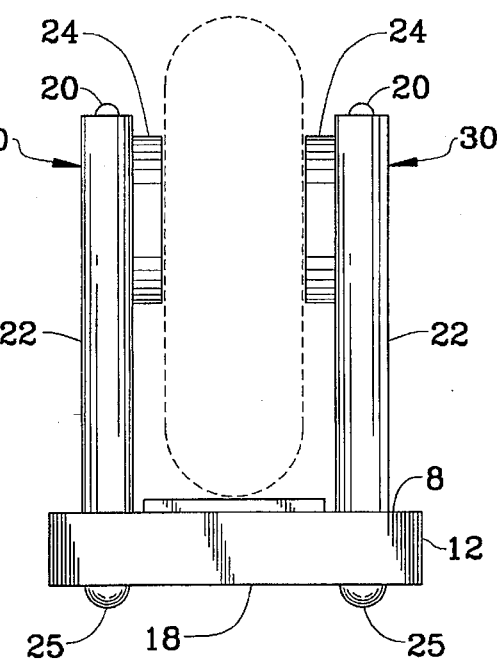
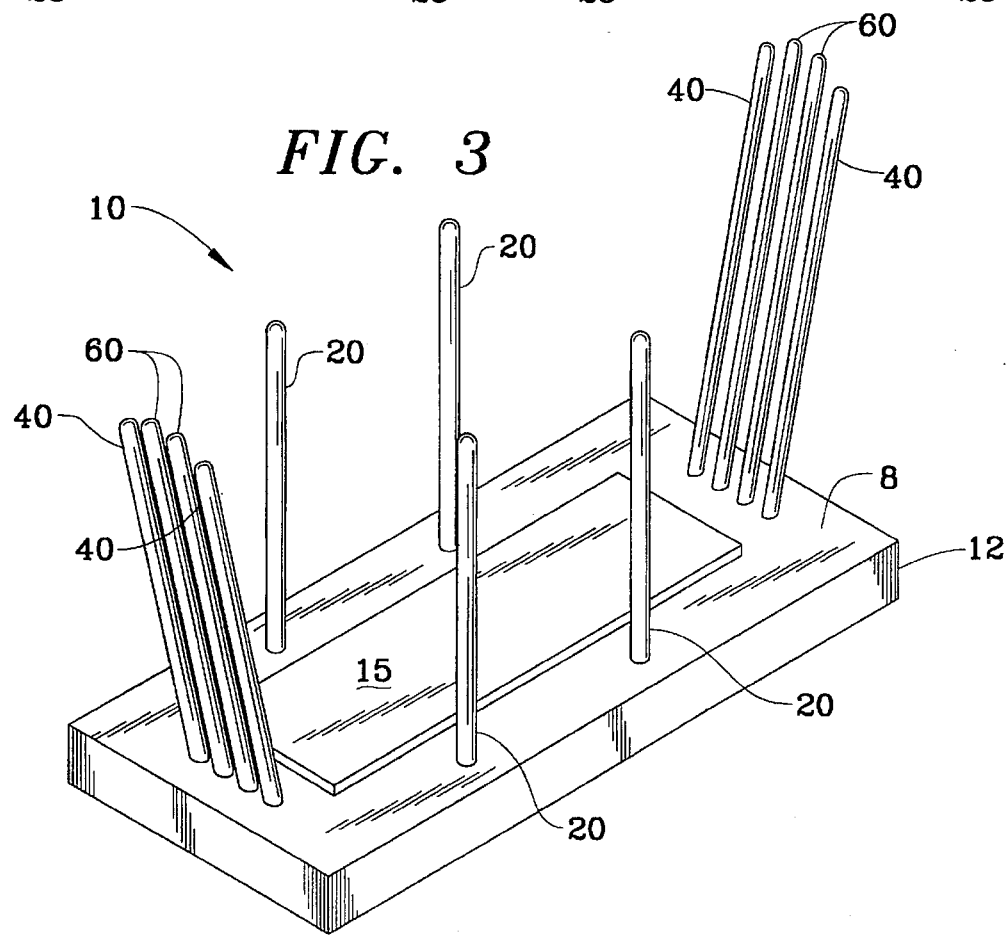

BAGEL AND BUN SLICER APPARATUS AND METHOD OF USE

FIELD OF THE INVENTION

This invention relates to a bread type slicing apparatus, but more specifically to a device for slicing bagels.

BACKGROUND OF THE INVENTION

The bagel arrived in America at the turn of the century. In New York around 1910 the bagel "industry" had a Bagel Bakers Local #338. Apprentices spent months learning the trade. Workers were paid 19 cents a box which contained 64 bagels. Popularity of the bagel spread beyond ethnic neighborhoods. In the early 60's bagels sold for 7 cents each. Now, bagel sales are approaching one billion dollars a year and are being called the "teddy bear of foods". However, this "teddy bear" can bite. Slicing a bagel by hand can result in very serious cuts to the hand. This has created the need for a safe and easy way to slice bagels, especially in the home. Hence, there are a variety of apparatuses for slicing bagels. Yet, a need continues to exist for a bagel slicer that is simple in design, inexpensive to own, and safe and easy to use.

A prior art device for slicing bagels is found in Apparatus for Slicing a Food Article of Ricard and Cann, U.S. Pat. No. 5,431,078 issued Jul. 11, 1995. Ricard et al discloses a two part device. The bottom member holds the bagel and the top member contains a guillotine type knife. The top member slides down over the bottom member slicing the bagel. There is no provision to center the bagel in the bottom member. If the bagel doesn't fill the width of the bottom member, the bagel can be tipped off center with the cut not being parallel to the top and bottom of the bagel. The blade in the top member is fixed and is very sharp and needs frequent cleanings. This is due to the various food flavoring accents added to the bagel mix. These additives remain moist and sticky even after being cooked. Accordingly, one or both halves of the bagel can become stuck to the blade upon completion of the slicing cycle. The problem now becomes how to remove the bagel halves from the top member without getting cut. This is a flawed design because the probability of being cut is very real.

Additionally, the bagel Slicer by Milo M. Keasrue, U.S. Pat. No. 5,361,666 issued Nov. 8, 1994, illustrates a tool that has to be adjusted in order to slice a bagel into two pieces. Another adjustment is needed to go from two slices to three slices. Yet another adjustment is needed to go from three slices to slice a bagel into four pieces. This tool is complicated, cumbersome, heavy and expensive to own.

Other patents that offer a device for slicing bagels are as follows: U.S. Pat. No. 5,431,078; U.S. Pat. No. 5,361,666; U.S. Pat. No. 4,807,505; U.S. Pat. No. 4,747,331; and U.S. Pat. No. 4,546,686. These patents additionally disclose devices which are problematic in their use and/or expensive to manufacture or own. Accordingly, a bagel slicer is needed which is easy to use and inexpensive to own. The slicer should be able to accommodate different sized foodstuffs and still achieve a centered slice. Also, the device should offer the additional ability to perform multiple slices of the bagel or bun.

SUMMARY OF THE INVENTION

Accordingly, the present invention provides an improved bagel slicer comprised of the following:

(a) a base member that is rectangular in shape;

(b) a pair of rods located along each side and at 90 degrees to the top of the base member so as to hold a foodstuff from sidewise movement;

(c) a pair of reversible insertable winged side guards;

(d) a set of two, three or four parallely located rod pairs at each end of the base member, but oriented at an outward angle along the longitudinal axis of the base member;

(e) each pair of side rods are placed directly opposite one another across the width of the base member.

A primary object of this invention is to provide a bagel slicer that prevents the user from being cut while slicing a bagel.

A further object is to provide a device that can be used by a left or right handed person without the need of adjustment. The device is uni-directional.

Yet a further object and advantage is to provide a bagel slicer that has no moving parts whereby it does not need to be adjusted to slice first one bagel in two pieces then slice the next bagel into three pieces and then slice a third bagel into four pieces. A bagel can be sliced in half, and without adjustment, the user can slice one or both of the halves again in half. Also, the bagel does not need to be moved in the process of all such slicing.

Still a further object and advantage is to provide a bagel slicer designed to be simple to understand and easy to use.

Another object and advantage is to provide a bagel slicer that will slice bagels of various diameters without having to pin, puncture or compress the bagel to immobilize it. A bagel is placed in this slicer until the ends of the bagel are in contact with the angled end rods. At this point, the bagel is cradled in place. This is a one size fits all bagel slicer, so to speak.

Still another object and advantage is to provide a bagel slicer with the versatility to slice a soft textured and/or an undersized foodstuff into as many as four equal slices. Examples are a Kaiser bun or a donut, respectively.

Yet another object and advantage is to provide a bagel slicer that is compact enough to be stored in a shallow kitchen drawer when not in use.

Other objects and advantages of this invention will become apparent from the following description taken in conjunction with the accompanying drawings wherein are set forth, by way of illustration and example, certain embodiments of this invention. The drawings constitute a part of this specification and include exemplary embodiments of the present invention and illustrate various objects and features thereof.

BRIEF DESCRIPTION OF THE DRAWINGS

FIG. 3 is shows a perspective view of the bagel slicer.

FIG. 5 shows the reversible winged side guard rod inserts in a first position.

FIG. 5a shows the reversible winged side guard rod inserts in a second position.

DETAILED DESCRIPTION OF THE PREFERRED EMBODIMENT

Figure 1:
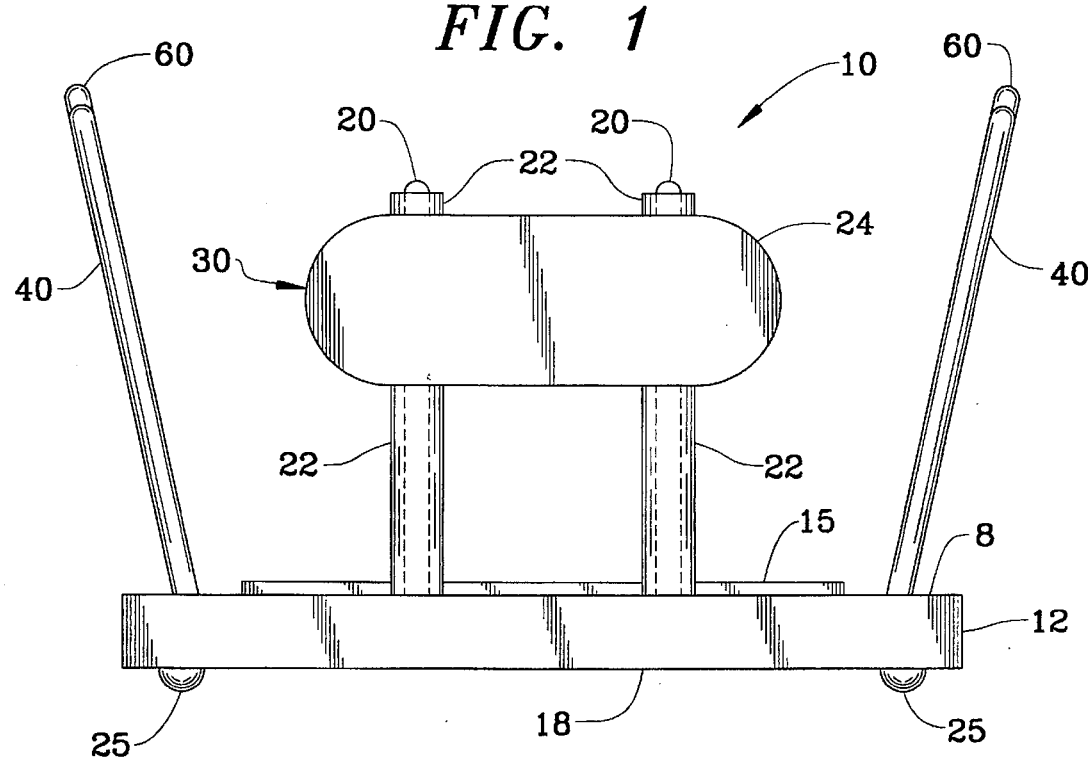
FIG. 1 is a side view of the bagel slicer.

In FIG. 1, device 10 is comprised of a rectangular base 12 having a top surface 8. Four non-slip foot pads 25 are affixed near the edges of the underside 18 of base 12. A cut resistant pad 15 is cemented in a central position on surface 8. Four side guide rods 20 are fixed to base 12 at right angles to surface 8. Two rods 20 are located along each side of base 12 at points that divide base 12 approximately in thirds. Opposite side guide rods 20 are separated in width approximately equal to the distance that separates them longitudinally. Two end cradle rods 40 and two end cradle rods 60 are affixed at each end of base 12 and in line along the width of base 12. Cradle rods 40 and 60 are angled outwardly along the longitudinal axis of base 12 from the center of base 12.

Figure 2:
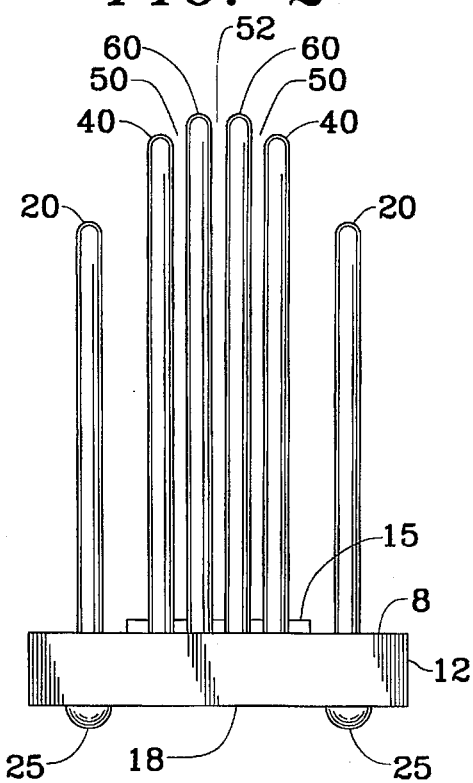
FIG. 2 is an end view of the bagel slicer.

In FIG. 2, cradle rods 40 and 60 have a space between them forming slot 50. Slot 50 is wide enough to allow passage of a knife blade from the tops of cradle rods 40 and 60 to surface 8. Slot 52 separating each pair of cradle rods 60 at each end of base 12 is directly over the imaginary longitudinal centerline of base 12. Side guide rods 20 are located so as to hold the thickness of a bagel central to the width of base 12.

FIG. 3 shows a perspective view of device 10. This view better illustrates the angled mounting of rods 40 and 60 to thereby cradle the bagel in the bottom of the slicer for cutting.

Figure 4:
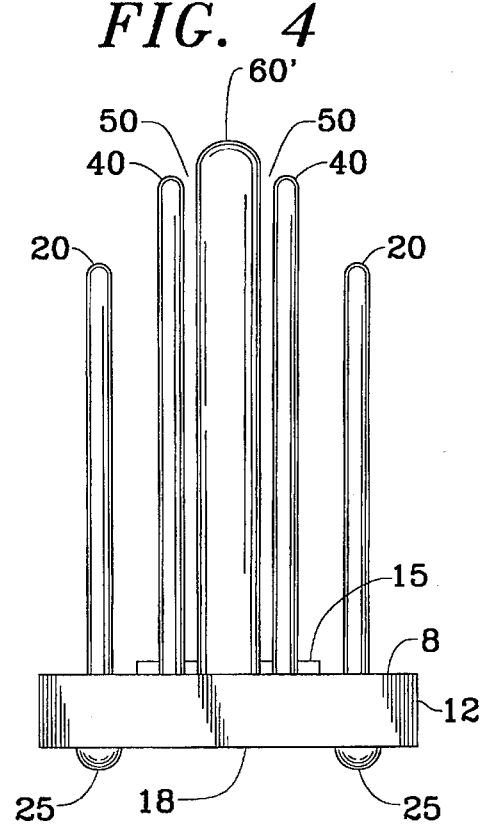
FIG. 4 is an end view of an alternative configuration of the bagel slicer.

FIG. 4 shows an alternative configuration of device 10 having an end cradle rod 60' at each end of base 12. These end cradle rods 60' are fifty percent thicker than end cradle rod 60 in FIG. 2. End cradle rod 60' is directly over the imaginary longitudinal centerline of base 12. This configuration allows for cutting a bun or bagel into thirds, as opposed to halves and/or fourths. It should be noted that any variety or number of end cradle rods might be used and such variations are taught by the present disclosure.

Referring now to FIG. 5, the device 10 is shown minus the end cradle rods 20, 40, 60, and 60' thereby focusing on reversible wing guard 30. Wing guard 30 includes a pair of tubular members 22 and pad 24. Tubular members 22 slide onto side rods 20. In this first example position, the pads 24 face outwardly from the device 10, with the image of a bagel shown ready for slicing as placed in device 10.

In FIG. 5a, the reversible winged guards 30 are shown in a second example position. The guards 30 have been lifted off side rods 20 and rotated 180 degrees and replaced onto side rods 20. In doing so, pads 24 face inwardly thereby providing a firm hold on thinner foodstuffs for slicing. Thinner foodstuffs include English muffins and donuts. The image of a donut is shown in device 10 ready for slicing.

Figure 6:
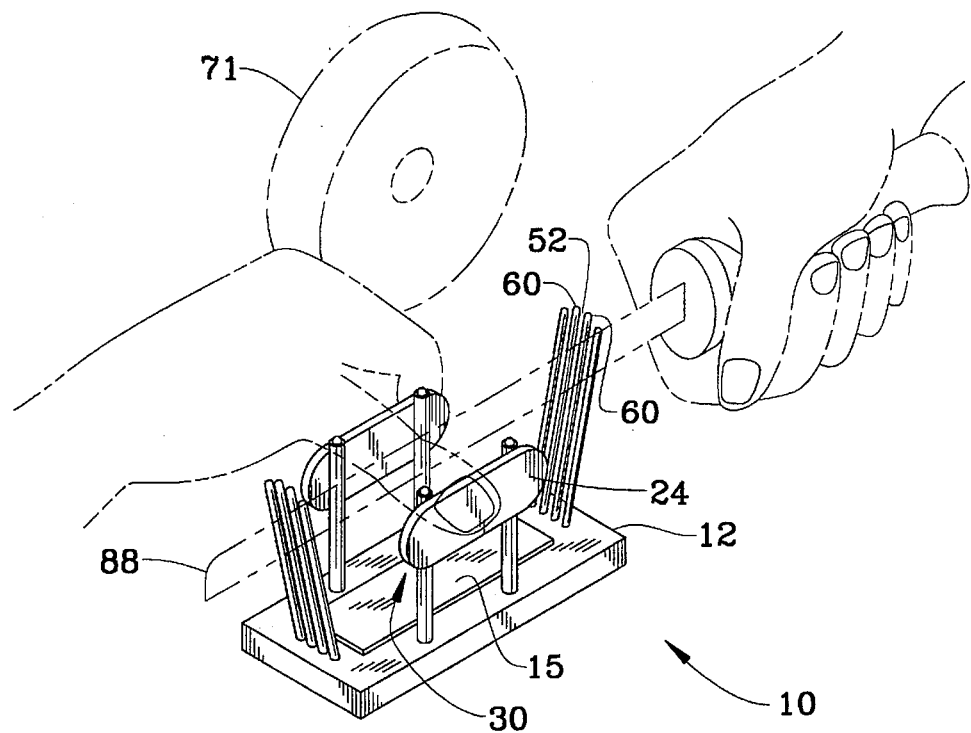
FIG. 6 illustrates operation of the bagel slicer.

Referring now to FIG. 6, a bagel 71 is shown placed in the device 10. Reversible wing guards 30 have the pad 24 facing outwardly. To slice the bagel 71 into halves, the user first places a knife blade 88 in opposing slots 52. Next, the user's hand is placed over device 10 with the thumb and fingers contacting the outside surfaces of the pad 24 on each wing guard 30. Using a short reciprocating movement, the knife blade 88 moves down slot 52 between paired opposing cradle rods 60, through bagel 71 to pad 15. This produces equal bagel halves that are easily received by, and removed from, a standard flat bread toaster. During all slicing procedures, the blade of the knife is restricted to a slot between paired opposing end cradle rods. With the user's hand completely outside device 10, it is highly improbable a self-inflicted knife wound can occur.

Figure 7:
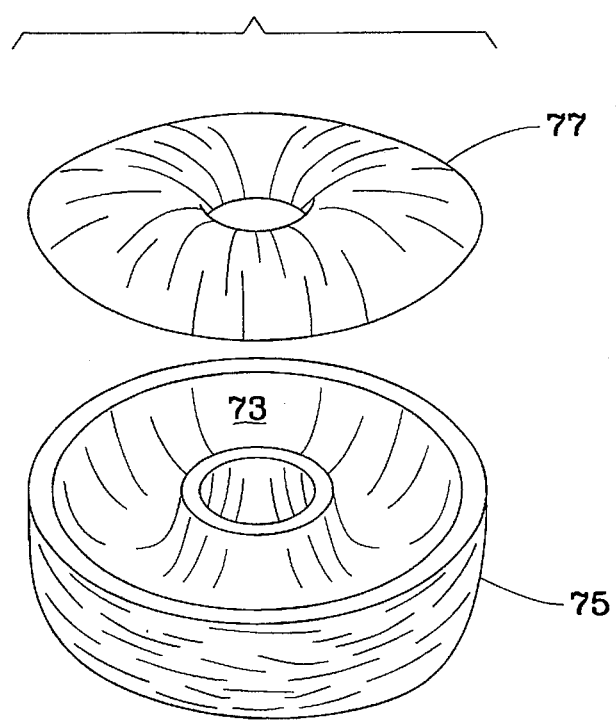
FIG. 7 shows a perspective view of an example resulting product.

Referring now to FIG. 7, an example resulting product is illustrated which can easily be created by the present invention. As shown, a ¼ slice is made producing bagel top 77. The remaining ¾ bagel bottom 75 is scooped out forming a channel 73. A sandwich filler can be conveniently placed in channel 73 such as ham salad, tuna salad, egg salad, etc. With or without bagel top 77 replaced on bagel bottom 75, a unique and novel sandwich is formed. Because the filler resides within channel 73, it is unlikely to drip or squeeze out the sides of the sandwich which often occurs on flat bread based sandwiches. The resulting "dug-out" sandwich is convenient, non-messy, and easy to handle.

While a variety of dimensions for the device might be used, the illustrated embodiment has an overall base length of approximately 4 to 5 inches, and has a width of approximately 2 to 2¾ inches. The side guide rods are approximately 3 to 4 inches long and the cradle rods are 4 to 5 inches long with the outside cradle rods slightly shorter. The angle of the cradle rods to base is approximately 20 to 30 degrees.

While the slicer base and rods might be constructed of a variety of materials, the embodiments shown use either wood or acrylic plastic. Some users find wood to be more aesthetically pleasing, while others find the clear plastic easier to clean due to its relative hardness. The winged side guard rod inserts might also be constructed of plastic such as PVC for ease in construction.

It is to be understood that while a certain form of the invention is illustrated, it is not to be limited to the specific form or arrangement of parts herein described and shown. It will be apparent to those skilled in the art that various changes may be made without departing from the scope of the invention and the invention is not to be considered limited to what is shown in the drawings and described in the specification.

I claim:

1. A bagel slicing device comprising:

a rectangular base member defined by a top surface, a bottom surface, with two end walls defining a length along a longitudinal axis therebetween and two side walls defining a perpendicular width;

a pair of side guide rod members juxtaposition along said side walls of said base member and extending upwardly therefrom at right angles to said top surface;

a pair of side guards operatively associated with each said pair of guide rod members, each said side guard including a pair of tubularly shaped support members slidably fitting over said side guide rod members with a pad member coupled therebetween;

a plurality of paired end cradle guide members angled upwardly from said top surface of said base member to form a bagel receiving cradle shaped area between said paired end cradle guide members, said end cradle guide member pairs positioned for receivably guiding a cutting device between adjoining member pairs;

a plurality of non-slip foot pads affixed to said bottom surface of said base member;

a cut resistant pad member affixed to said top surface of said base member forming a cutting area;

wherein said guide rod members serve to center the bagel along said width of said base member.

2. The bagel slicing device of claim 1, wherein said side guards are removably coupled to said side guide rod members by sliding said pair of tubular support members over said pair of rod members in a first position, said tubular support members being reversible to fit over said pair of rod members in a second position, wherein said side guards maintain foodstuff central to said width of said base member providing a safety barrier for keeping the user's hand outside said cutting area.

3. The bagel slicing device of claim 1, wherein said device has two end cradle guide member pairs, each pair comprised of individual end cradle guide members extending upwardly from said top surface of said base member, wherein each said individual end cradle guide member mounted opposite its pairing at each longitudinal end of said base member, said end cradle guide member pairs arranged in a parallel row so that between each parallel adjoining pair there is a space forming a slot wide enough to pass a knife blade down through.

4. The bagel slicing device of claim 3 wherein said upwardly extending end cradle guide member pairs taper outwardly along said top surface of said longitudinal axis of said base member with said pairs arranged across said top surface of said width of said base member.

5. The bagel slicing device of claim 3, wherein said base member includes a centerline dividing said base member longitudinally in half, said arranged rows of end cradle guide pairs forming a plurality of slots therebetween including a middle slot located over said centerline.

6. The bagel slicing device of claim 1, wherein four non-slip foot pads are affixed to said bottom surface of said base and said cut resistant pad is applied centrally on said top surface of said base.

7. The bagel slicing device of claim 1, wherein said base member has three end cradle guide member pairs with said pairs extending upwardly from said top surface of said base member, said pairs comprised of individual end cradle guide members, each said individual end cradle guide member mounted opposite its pairing at each longitudinal end of said base, said end cradle guide member pairs arranged in a parallel row so that between each parallel adjoining pair there is a space forming a slot wide enough to pass a knife blade down through.

8. The bagel slicing device of claim 7, wherein said end cradle guides taper outwardly along said top surface of said longitudinal axis of said base member, said end cradle guides arranged across said top surface of said width of said base member.

9. The bagel slicing device of claim 7 wherein said base member includes a centerline dividing said base member longitudinally in half, said guide member pairs including a middle pair which is located over said centerline.

10. The bagel slicing device of claim 7, wherein four non-slip foot pads are affixed to said bottom surface of said base member and said cut resistant pad is applied centrally on said top surface of said base member.

11. The bagel slicing device of claim 1, wherein said base member has four end cradle guide member pairs, said pairs comprised of individual end cradle guide members with said pairs extending upwardly from said top surface of said base member, each said individual end cradle guide member mounted opposite its pairing at each longitudinal end of said base member, said end cradle guide member pairs arranged in a parallel row so that between each parallel adjoining pair there is a space forming a slot wide enough to pass a knife blade down through.

12. The bagel slicing device of claim 11 wherein said end cradle guides taper outwardly along said longitudinal axis of said top surface of said base member and are arranged across said top surface of said width of said base member.

13. The bagel slicing device of claim 11 wherein said base member includes a centerline dividing said base member longitudinally in half, said slots formed between said end cradle guides including a center-most slot located over said centerline.

14. The bagel slicing device of claim 11 wherein four non-slip foot pads are affixed to said bottom surface of said base member and said cut resistant pad is applied centrally on said top surface of said base member.

* * * * *